United States Patent [19]
Hershkowitz et al.

[11] Patent Number: 5,980,596
[45] Date of Patent: Nov. 9, 1999

[54] MULTI-INJECTOR AUTOTHERMAL REFORMING PROCESS AND APPARATUS FOR PRODUCING SYNTHESIS GAS (LAW 565).

[75] Inventors: Frank Hershkowitz, Liberty Corner; Harry W. Deckman; Robert P. Reynolds, both of Clinton, all of N.J.; Constantine P. Gonatas, Houston, Tex.; John W. Fulton, Randolph, N.J.; Leonard Schoenman, Citrus Heights; Jack I. Ito, Sacramento, both of Calif.; Russell J. Koveal, Baton Rouge, La.; Costas A. Coulaloglou, Mendham, N.J.

[73] Assignee: Exxon Research and Engineering Co., Florham Park, N.J.

[21] Appl. No.: 08/845,706

[22] Filed: Apr. 25, 1997

[51] Int. Cl.[6] .................................. B01J 8/00; B01J 8/04; C07C 27/00

[52] U.S. Cl. .................. 48/127.9; 48/198.7; 422/197; 422/198; 422/211; 518/702; 518/715

[58] Field of Search ................. 48/127.9, 198.7; 422/198, 197, 211; 518/702, 715

[56] References Cited

U.S. PATENT DOCUMENTS

| | | | |
|---|---|---|---|
| 3,542,894 | 11/1970 | Bartholome et al. | 260/679 |
| 3,881,701 | 5/1975 | Schoenman et al. | 259/4 |
| 4,650,651 | 3/1987 | Fuderer | 422/191 |
| 4,722,181 | 2/1988 | Yu | 60/39.06 |
| 4,741,885 | 5/1988 | Herbort et al. | 422/197 |
| 4,801,092 | 1/1989 | Webber et al. | 239/418 |
| 4,844,837 | 7/1989 | Heck et al. | 252/373 |
| 4,877,550 | 10/1989 | Goetsch et al. | 252/373 |
| 4,925,456 | 5/1990 | Egglestone | 48/127.9 |
| 5,037,619 | 8/1991 | Alagy et al. | 422/191 |
| 5,106,590 | 4/1992 | Hopper et al. | 422/198 |
| 5,112,578 | 5/1992 | Muroyama et al. | 422/197 |
| 5,143,647 | 9/1992 | Say et al. | 252/373 |
| 5,160,456 | 11/1992 | Lahn et al. | 252/373 |
| 5,292,246 | 3/1994 | Gateau et al. | 431/328 |
| 5,458,857 | 10/1995 | Collins et al. | 422/198 |
| 5,492,649 | 2/1996 | Christensen | 252/372 |
| 5,510,056 | 4/1996 | Jacobs et al. | 252/373 |

FOREIGN PATENT DOCUMENTS

| | | |
|---|---|---|
| 2153304 | 5/1995 | Canada . |
| 0303438 | 2/1989 | European Pat. Off. . |
| 0303439 | 2/1989 | European Pat. Off. . |
| 0312133 | 4/1989 | European Pat. Off. . |
| 932429 | 7/1963 | United Kingdom . |
| 2202321 | 9/1988 | United Kingdom . |
| WO-90/06281 | 6/1990 | WIPO . |
| WO-90/06282 | 6/1990 | WIPO . |
| WO/90/06297 | 6/1990 | WIPO . |

OTHER PUBLICATIONS

"Improve syngas production using autothermal reforming" by Christensen et al., Hydrocarbon Processing, Mar. 1994, pp. 1 to 6.

"Burners for Secondary and Autothermal Reforming—Design and Industrial Performance" by Christensen et al, AIChE Ammonia Safety Symposium, Vancouver, BC, Canada Paper No. 3g, Oct. 4, 1994 pp. 1 to 15.

Primary Examiner—Nina Bhat
Attorney, Agent, or Firm—Jay Simon

[57] ABSTRACT

A novel injector/reactor apparatus and an efficient process for the partial oxidation of light hydrocarbon gases, such as methane, to convert such gases to useful synthesis gas for subsequent hydrocarbon synthesis. Sources of a light hydrocarbon gas, such as methane, and oxygen or an oxygen-containing gas are preheated and pressurized and injected through an injector means at high velocity into admixture with each other in the desired proportions, preferably at comparable momentums, at a plurality of mixing nozzles which are open to the reaction zone of a reactor and are spaced over the face of the injector, to form a reactant gas premix having a pressure drop equal to at least 1% of the lowest upstream pressure of either of said gas streams. The gas premix is ejected in a time period which preferably is less than 9 milliseconds, at a velocity between about 25 to 1000 feet/second, into a reaction zone comprising a partial oxidation zone, so that the gas mixture reacts therein. The partially-oxidized effluent is then passed into a steam reforming catalyst zone to reduce the amounts of $CO_2$, $H_2O$ and heat produced by the partial oxidation reaction to form the useful syngas, which is cooled, recovered and/or further processed.

40 Claims, 3 Drawing Sheets

MULTI-INJECTOR AUTOTHERMAL REFORMING PROCESS AND APPARATUS FOR PRODUCING SYNTHESIS GAS (LAW 565).

BACKGROUND OF THE INVENTION

Field of the Invention

The present invention relates to improvements in processes and apparatus for producing synthesis gas, or syngas, from light hydrocarbon gas such as methane or natural gas by the partial oxidation and autothermal steam reforming thereof. Such syngas, comprising a mixture of carbon monoxide and hydrogen, is useful for the preparation of a variety of other valuable chemical compounds, such as by application of the Fischer-Tropsch process.

The combustion stoichiometry of methane gas at 1000° F. is highly exothermic and produces $CO_2$ and $H_2O$ according to the following reaction:

$$CH_4 + 2O_2 \rightarrow CO_2 + 2H_2O$$

(−190.3 kcal/g mol $CH_4$).

The formed gases are not useful for the production of valuable chemical compounds, and the high temperatures generated present problems with respect to reactors and catalysts which would be required to produce valuable products from the formed gases.

It is known to produce useful gases, known as synthesis gases or syngases, by partial oxidation of methane and other light hydrocarbon gases, by steam or CO2 reforming of methane and other light hydrocarbon gases, or by some combination of these two chemistries. The partial oxidation reaction of methane is a less highly exothermic reaction which, depending upon the relative proportions of the methane and oxygen and the reaction conditions, can proceed according to the following stoichiometry:

$$2CH_4 + 2O_2 = 2CO + 2H_2 + 2H_2O$$

(−64 kcal/g mol $CH_4$.)

$$2CH_4 + 1.5O_2 = 2CO + 3H_2 + 1H_2O$$

(−34.9 kcal/g mol $CH_4$.)

or $$2CH_4 + O_2 = 2CO + 4H_2 + OH_2O$$

(−5.7 kcal/g mol $CH_4$.)

It is most desirable to enable the partial oxidation reaction to proceed according to the latter reaction in order to produce the most valuable syngas and minimize the amount of heat produced, thereby protecting the apparatus and the catalyst bed, and to reduce the formation of steam, thereby increasing the yield of hydrogen and carbon monoxide, and enabling the steam-reforming reaction to convert any steam and hydrogen into useful syngas components.

Conventional syngas-generating processes include the gas phase partial oxidation process (GPOX), the autothermal reforming process (ATR), the fluid bed syngas generation process (FBSG), the catalytic partial oxidation process (CPO) and various processes for steam reforming. Each of these processes has advantages and disadvantages when compared to each other.

The GPOX process, illustrated for example by U.S. Pat. No. 5,292,246; UK Application GB 2,202,321A and EPO Application 0 312 133, involves the oxidation of the feed hydrocarbon gaseous, liquid or solid form, in the gas phase rather than on a catalyst surface. The individual components are introduced at a burner where they meet in a diffusion flame, which produces over-oxidation and excessive heat generation. The gas may be preheated and pressurized, to reduce the reaction time.

The ATR process and the FBSG process involve a combination of gas phase partial oxidation and steam reforming chemistry.

In the conventional ATR process, illustrated for example by U.S. Pat. No. 5,492,649 and Canadian Application 2,153,304, the hydrocarbon feed and the oxygen feed, and optionally steam, are heated, and mixed in a diffusion flame at the outlet of a single large coaxial burner or injector which discharges into a gas phase oxidation zone. The gases are reacted in the gas phase in the partial oxidation combustion zone, and then flow into a large bed of steam reforming catalyst, such as large catalyst pellets, or a monolithic body or ceramic foam, to catalyze the steam reforming reaction. The entire hydrocarbon conversion is completed by a single reactor aided by internal combustion. The burner is the key element because it mixes the feedstreams in a turbulent diffusion flame. The reaction products are introduced to the fixed bed catalyst zone, preferably of large catalyst pellets, at high temperatures from the combustion zone, due to the over-oxidation which occurs in the diffusion flame of the burner, where the oxygen and hydrocarbon gas meet. The diffusion flame includes oxygen-rich and hydrocarbon-rich zones. These result in both complete combustion and substantially higher temperatures, in the oxygen-rich zones, and hydrocarbon cracking and soot-formation, in the hydrocarbon-rich zones.

In the ATR process, the gases are intended to react before they reach the catalyst, i.e., the oxidation chemistry occurs in the gas phase, and only the steam reforming chemistry occurs in the catalytic bed. In fact, long residence times are required because diffusion flames are initiated with a large amount of over-oxidation, accompanied by a large amount of heat. Thus, time is required for the relatively slow, endothermic gas phase steam reforming reactions to cool the gas enough to prevent thermal damage to the catalyst.

The gas phase partial oxidation and steam reforming chemistry employed in the FBSG and the Autothermal Reforming (ATR) process have very similar material balance when using similar feed. However, ATR is limited in size by the scaleability of its injector design, and the more-scalable FBSG is economically debited by the cost of fluid solids and dust cleanup and by the expense of replacing agglomerated and/or eroded catalyst. The dust comprises catalyst fines due to catalyst attrition in the bed, and these fines are expensive to clean out of the syngas. While the chemistry is correct, these two processes have significant drawbacks. Both require very large reactors. For FBSG there is a significant expense in fluid solids management. For Autothermal Reforming there is a large and problematic methane/oxygen feed nozzle.

In the autothermal reforming process, the methane and oxygen-containing gases are mixed and reacted in a diffusion flame, and the oxidized effluent is passed into a steam reforming zone for steam reforming of the effluent in the presence of a fixed arrangement of a conventional steam reforming catalyst, such as a fixed catalyst bed or a ceramic foam or monolith carrier impregnated with a steam reforming catalyst.

The high temperature in the catalytic reforming zone places great demands on the reforming catalyst, which must withstand these conditions and be capable of substantially retaining its catalytic activity and stability over many years of use.

Conventional steam-reforming catalysts, or autothermal or combined reforming catalyst, can be described as being selected from the group consisting of uranium, Group VII metals, and Group VIII noble and non-noble metals. Metals may be used in combination with each other and with other metals such as lanthanum and cerium. The metals are generally supported on thermally-stable inorganic refractory oxides. Preferred catalyst metals are the Group VIII metals, particularly nickel. In the case of nickel, any nickel-containing material is useful, e.g. nickel supported on alpha alumina, nickel aluminate materials, nickel oxide, and preferably a supported nickel containing material.

Support materials include α-alumina, aluminosilicates, cement, and magnesia. Alumina materials, particularly fused tabular alumina are particularly useful as catalyst support. Preferred catalyst supports may be Group II metal oxides, rare earth oxides, α-alumina, modified α-aluminas, α-alumina-containingoxides, hexa-aluminates, Ca-aluminate, or magnesium-alumina spinel. In some cases, catalysts are stabilized by addition of a binder, for example calcium aluminum oxide. Silicon Dioxide level in the catalyst is preferred to be maintained at a very low level, e.g. less than 0.3 wt % to avoid volatilization and fouling of downstream equipment.

The shape of the catalyst carrier particles may vary considerably. Raschig rings 16 mm in diameter and height having a single 6–8 mm hole in the middle are well known in the art. Other forms, such as saddles, stars, and spoked wheels are commercially available.

According to the autothermal steam reforming process of U.S. Pat. No. 5,492,649 the production of high amounts of carbon or soot in the diffusion flame oxidation step is avoided by mixing the methane gas with the oxidizer gas while swirling the latter at the injection nozzle to provide a large number of mixing points in the diffusion flame. However, such process still produces the partial oxidation reaction in a diffusion flame, which results in overoxidation and an excessively high temperature effluent which can damage the steam reforming catalyst and the face of the injector.

According to Canadian Application 2,153,304, the formation of soot is avoided or reduced by reducing the molar feed ratio of steam to carbon to increase the steam reforming temperature between about 1100° to 1300° C., and/or by introducing the gaseous hydrocarbon feed in increments.

SUMMARY OF THE INVENTION

The present invention relates to a novel compact apparatus and an efficient autothermal reforming process for the partial oxidation and steam reforming of light hydrocarbon gases to convert the gases, such as methane, to useful synthesis gas at moderate $H_2/CO$ ratios desired for subsequent hydrocarbon synthesis. The essence of the present process involves providing sources of a light hydrocarbon gas containing $C_1$ to $C_4$ alkanes, such as methane, and oxygen or an oxygen-containing gas, preheating and pressurizing said gases, and injecting said individual gases at high velocity through a plurality of isolated small passages of an injector manifold, into impingement and admixture with each other to form a gaseous premix having a pressure drop ($\Delta P$) which is more than 1% lower, preferably more than about 3% lower and possibly more than about 5% lower than the lowest upstream pressure ($P_u$) of either of the gases relative to the gas pressure ($P_c$) in the inlet to the partial oxidation zone, and having the desired stoichiometric molar proportions, e.g., oxygen ($O_2$) to carbon (C) molar ratio of from about 0.3 to 0.8 mole of oxygen per mole of carbon, preferably 0.45–0.70 to 1.0, at a plurality of injection nozzles or microjet cups which are open to a gas phase partial oxidation reaction zone and are spaced over the face surface of an injector, preferably of the type used in the rocket or aerospace industry. The gaseous premix is injected into the partial oxidation reaction zone within a maximum residence time after impingement at the injector nozzles or cups which is shorter than the autoignition time delay of the gaseous premix and preferably is less than 9 milliseconds, more preferably less than 2 milliseconds and most preferably less than 0.5 millisecond, and at a high velocity such as about 25 and 1000 ft/sec, preferably 50 and 500 ft/sec, and most preferably between 50 and 300 ft/sec, into a combustion or reaction zone comprising a gas phase partial oxidation zone. The partially oxidized gaseous premix effluent is then passed into a steam reforming catalyst bed or a catalyst retained in a fixed arrangement, such as into the catalytic passages of a parallel-pore ceramic or metallic monolith, or a ceramic or metallic foam monolith, in which any hydrocarbons remaining in the effluent from the partial oxidation reaction zone are converted with the aid of the steam reforming catalyst.

The partial oxidation reaction occurs before or simultaneously with the autoignition time delay of the gaseous premix, to reduce the amounts of $CO_2$, $H_2O$ and heat produced by the partial oxidation reaction to favor the desired stoichiometry, i.e., $$2CH_4+1O_2 \rightarrow 2CO+4H_2+OH_2O-5.7 kcal/g\ mol\ CH_4.$$

The present process and apparatus represents an improved autothermal reforming (ATR) process by premixing the light hydrocarbon fuel gas and the oxidizing gas to form a gaseous premix having a pressure which is at least 1% lower than the lowest upstream pressure of either gas, and preferably, substantially reducing the delay time between the mixing of the preheated, pressurized reactant gases in the desired stoichiometric amounts and the introduction of the homogeneous gaseous premix to the gas phase oxidation zone.

The feeding of the gaseous premix feed to the gas phase oxidation zone avoids the problems of over-oxidation and soot formation, as occurs in the conventional ATR process where the gases are first mixed in a diffusion flame, while the reduced delay time or duration of existence of the formed stoichiometric gaseous premix, prior to controlled reaction, avoids the dangers presented by the explosive nature of a preheated mixture of oxygen and methane.

The present process and apparatus enables the partial oxidation reaction to be completed while the bulk of the gaseous premix is in the gas phase POX zone as a homogeneous and stoichiometric mixture, since a uniform gaseous premix can be formed at and ejected from each of the plurality of ejector nozzles or cups which are distributed over the wide diameter injector face corresponding to the width of the diameter of the entry face of the gas phase partial oxidation zone, thereby avoiding the introduction of bulk gaseous streams which are oxygen-lean or oxygen-rich, which can interfere with the desired stoichiometric reaction and can result in hot spots which can burn or sinter the downstream catalyst and/or destroy the solid monolith carrier, and/or damage the face of the injector or the walls of the reactor.

In one embodiment of the present invention, different regions of the gas phase partial oxidation zone are fed with different, homogenous feed mixtures to produce predetermined localized results. Specifically, a minority of the feed injection nozzles, such as up to about 25% thereof, may be designed to create a gaseous premix that has a slightly higher or lower than average oxygen/methane ratio. For example, one out of every seven injection nozzles, representing the center injection nozzle in a hexagonal pattern, may be designed with larger oxygen orifices to dischargesa more oxygen-rich composition that would have higher flame speed, would be more difficult to extinguish, and thus would serve as a "pilot light" to prevent the reaction of the bulk mixture from being extinguished, particularly at the high gas velocity associated with high reactor productivity. In addition, injection nozzles near the outer perimeter of the wide diameter injector face may be designed with larger methane orifices to discharge a more methane-rich composition that would provide a cooler environment near the reactor walls in the partial oxidation zone, reducing heat loss and cost of reactor construction. A key feature of the present invention is that these localized stoichiometric variations are only present in a minority of the nozzles and can be designed into the injector assembly in a controlled fashion, for example the "pilot light" discussed above may be designed to provide gaseous premix at a precisely controlled oxygen ($O_2$)/carbon ratio in the range of 0.75–1.5, and such oxygen-rich composition mixture will be ejected into the partial oxidation zone as a highly mixed composition, free of problems of hot spots and soot generation that occur with different diffusion flames.

The hydrocarbon gas stream introduced to the mixer/injector may contain components other than methane and $C_2$–$C_4$ hydrocarbons. Other components, for example $H_2O$ and $CO_2$, may be present in the hydrocarbon gas in relatively large amounts, such as from about 0.0 to 1.0 mol of $H_2O$ or $CO_2$ per carbon atom of the light hydrocarbon gas. Other components, for example, $H_2$, CO, Ar, $N_2$, $NH_3$, HCN, $H_2S$, COS, $CS_2$, organic sulfur-containing compounds, organic oxygenates, and $C_5$+hydrocarbons may be present in lower concentrations, typically less than 0.10 mol of the component per carbon atom of the light hydrocarbon gas although higher levels may be present. The oxygen-containing gas stream introduced to the mixer/injector may likewise contain components other than oxygen. These components are typically $N_2$, $CO_2$, $H_2O$, and Ar. Some of these components, especially $N_2$, $CO_2$, and $H_2O$, may be present in major amounts, from 0.0 to 4.0 mol per mole of oxygen ($O_2$). Other components are typically present in lesser amounts, normally less than 0.1 mol of component per mole $O_2$.

It will be recognized by those skilled in the art, that the gaseous premixes that are formed when the hydrocarbon stream and the oxidant stream are ejected into the mixing area of nozzle will not be perfectly mixed at the point of initial contact. In any real physical device, some time or distance will be required before perfect mixing is achieved. As used herein, the term "feed stream" means the individual streams, such as of hydrocarbon or oxygen containing gas, that are being fed to the mixing area or feed nozzle, and the term "gaseous premix" means the physical combination of these feed streams in a state that is highly mixed. Of greatest importance in the present invention is that the streams achieve a high degree of mixedness in a minimum amount of time and distance, before gas phase reactions begin to occur at any substantial level. In order to quantify this degree of mixedness, the measure "Efficiency of Mixing", abbreviated as $E_m$, is used.

$E_m$ is calculated from the composition profile of the stream of the gaseous premix. Composition profiles can be obtained by sampling the stream at many locations, or by use of other diagnostic tools. For example, imaging the Rayleigh-scattered light of a laser beam can, under properly controlled conditions, provide composition variations across partially mixed streams. The composition data is used to calculate how much of each individual feed stream is present at each location of the admixed stream. For example, if one is mixing air with methane, the oxygen and nitrogen mole fractions would be combined to represent the mole fraction of the air stream.

For the case where hydrocarbon (abbreviated HC) and oxygen-containing (abbreviated OX) feed streams being mixed, we define $E_m$ using the following equation:

$$E_m = ((X_{HC}/X_{OX})_{MIN}/(X_{HC}/X_{OX})_{MAX})^{0.5}$$

Where $X_{HC}$ and $X_{OX}$ represent mole fractions in the gaseous premix of hydrocarbon gas and oxygen-containing gas, and the subscripts "MIN" and "MAX" designate that these are the minimum and maximum ratios found in the gaseous premix. Thus, $(X_{HC}/X_{OX})_{MIN}$ represents the minimum HC/OX mole fraction ratios found in the composition profile. As so defined, $E_m$ reaches a value of 1.0 when the gases are perfectly mixed, and will have a value of 0.0 if the stream has any locations that are completely unmixed (has a location where the composition is equal to that of either feed stream).

In the practice of the present invention, the gaseous premix achieves a high degree of mixedness, quantified as $E_m$, in a minimum amount of time. We specify this rate of achieving high mixedness by specifying the distance downstream of the injector at which a given $E_m$ level will be attained. Because injector sizes may vary greatly, and because mixing distances tend to scale linearly with injector size, we define the distance downstream of the injector in proportion to a critical nozzle dimension. In particular, we define L as the distance downstream from the point of initial contact between the gases adjacent the floor of the mixing nozzle, and we define D as the diameter or similar dimension of the largest orifice through which either feed stream is introduced into admixture in the nozzle. $D_{AX}$ is the diameter of the exit orifice feeding the gas stream that is most axial with the path of the gaseous premix, or most near the center of the injector or as the stream being introduced in the fewest number of orifices within the nozzle. It is preferred that mixing nozzles be used in the present invention that achieve an $E_m$>75% at a distance (L) downstream of $L/D_{AX}$ up to about 10, and generally between 1 to 6. It is more preferred that nozzles achieve $E_m$>80% at this distance, and most preferred that the nozzles achieve $E_m$>90% at this distance downstream.

An important parameter defining the effectiveness of mixing is the "momentum ratio" of the streams being mixed. The momentum of a stream is defined as the product of the velocity of the stream as it is injected into the mixing zone multiplied by the stream's mass rate. For efficient mixing the ratio of the momentums of the mixed streams should be comparable. Poor mixing performance can occur if the momentums of the streams are disparate. In the case of a mixing nozzle with axial injection of oxygen-containing gas and radially-or somewhat radially-injected hydrocarbon gas, the ratio of the momentum of the hydrocarbon gas to the momentum of the oxygen-containing gas is preferably in the range of 0.5–4.0, most preferably from 1.0–3.0. For the opposite case of axially-injected hydrocarbon gas and radially-or somewhat radially-injected oxygen-containing gas, the ratio of the momentum of the hydrocarbon gas to the momentum of oxygen-containing gas is in the range of 0.25–2.0, preferably from 0.33–1.0. It is understood that if a gas is injected in more than one stream into a mixing chamber then the sum of the momentums, or summed momenta, of all of the streams of the particular gas is used in the calculation of the momentum ratio.

The present multi-orifice, large diameter injectors operate at extremely high speeds, up to sonic speeds, and discharge the separate gases, e.g., methane and oxygen, in a predetermined ratio from closely-spaced orifices, i.e., within up to about 0.5 inch of each other, into direct contact with each other within a plurality of small mixing nozzles or cups at the injector surfaces, or at an angle between about 60° up to about 180° relative to each other for intersecting contact or impingement and admixture immediately above the injector surface, for discharge or injection of the homogeneous preheated pressurized gaseous premix into the gas phase partial oxidation zone at extremely high velocity and at a pressure which is more than 1% or 3% or 5% lower than the lowest upstream pressure of either of the gases. The dwell time of the gaseous premix within or immediately beyond the injector surface prior to injection into the partial oxidation reaction zone preferably is less than about 9 milliseconds, more preferably less than about 2 milliseconds, and most preferably less than 0.5 millisecond, to substantially avoid undesirable gas phase reactions upstream of the gas phase partial oxidation zone. Also the velocity of the homogeneous gas mixture as it is ejected from the mixing nozzles is from about 25 to 1000 ft/sec, more preferably between about 50 to 500 ft/sec and most preferably between about 50 and 300 ft/sec, whereby efficient syngas production is enabled by compact reactors of higher throughput than heretofore possible.

As used herein, references to the velocity at which the gaseous premix is passed to the partial oxidation zone should be taken to mean the local gas velocity as the gaseous premix leaves the mixing nozzles, and not some reactor-average superficial velocity The most critical feature of the high speed gas injectors of the present ATR apparatus is that they are designed to produce a drop or reduction of the initial gas pressure through the injector which is greater than 1%, preferably greater than 3% and possibly greater than about 5% of the lowest upstream gas pressure ($P_u$) of either of the individual gas streams, which upstream pressure is normally between 10 and 100 atmospheres, preferably between about 20 and 50 atmospheres, i.e., the pressure reduction, or $\Delta P$, or $P_u-P_c$ divided by the reaction chamber inlet pressure, or Pc, is >1%, preferably >3% and possibly >5% relative to the reaction chamber inlet pressure. This pressure drop causes the oxidation gas and the hydrocarbon gas to be drawn into more intimate admixture immediately in advance of injection into the partial oxidation (POX) zone to form the desired stoichiometric gaseous premix containing between 0.3 and 0.7 mols of oxygen per mol of methane, having a single carbon atom, or per carbon atom if the light hydrocarbon gas is one having more than one carbon atom. The pressure drop also improves the uniformity of flow of the gases through the injector to avoid instabilities. This is particularly important in the case of economically advantageous, very large reactors which employ a plurality of side-by-side mixers/injectors to supply the premix to the large-diameter reactor, most particularly in reactors containing a gas phase partial oxidation zone preceding a steam reforming zone, which system is deleteriously affected by the soot formation and high temperatures that accompanies non-homogenous feed. The pressure drop as the gases pass through the injector results in a high gas mixing efficiency ($E_m$) as close as possible to the face of the injector to produce the gaseous premix of the gases having the desired stoichiometry immediately in advance of the passage of the gaseous premix into the partial oxidation zone. The desired ratio of the hydrocarbon gas and the oxygen gas always has an excess of the hydrocarbon to prevent over-oxidation, excessive heat and soot formation. In cases where the mixing nozzles of the injector are tubular cups or wells recessed below the face surface of the injector, the point of 75 to 90% $E_m$ occurs at a location which depends on the diameter ($D_{AX}$) of the most axial feed gas orifice into the cup or well, i.e., $E_m$ occurs at an $L/D_{AX}$ of 10 or less, such as 1 or 2. As mentioned, this mixing efficiency is enabled by the uniform pressure drop, or $\Delta P$, as the gases pass through the isolated small passages of the injector manifold and through the nozzle orifices to impinge at each of the mixing zones, chambers, or cups, and the uniformity of the pressure drop assures uniform continuous gas supply to each of the mixing nozzles or cups even when a plurality of injectors are assembled side by side and fed from common gas sources to feed very large diameter gas phase POX reaction chambers.

The injection of the stoichiometric gas premixture down into the partial oxidation zone chamber of the reactor, spaced below the face of the injector and upstream of the catalytic steam reforming zone chamber of the reactor, allows the partial oxidation reaction or combustion to take place at lower temperatures, without overoxidation and away from the face of the injector, to avoid thermal damage thereto. Then the partially oxidized gases pass into and through the catalytic steam reforming zone chamber to convert steam and methane present in the reaction gases into useful syngas, namely hydrogen and carbon monoxide, which are recovered or further processed.

It is an advantage of the present invention that the present apparatus enables a gas phase partial oxidation reaction that is fed by a more homogeneous or uniform supply of reactant gaseous premix composition. Because gaseous premix feed gas is a mixture of hydrocarbon and oxygen-containing streams that is very reactive, particularly reactive at the high pressures and temperatures desired for syngas generation, the time available to mix gases before introducing them into the partial oxidation zone is very limited. Thus, we have discovered that the feed injectors of the present apparatus achieve high levels of $E_m$ in very short physical distances, on the order of inches, not feet, and achieve high $E_m$ in short $L/D_{AX}$ wherein $D_{AX}$ is the diameter of the axial stream orifice, usually the oxygen gas orifice, and L is the distance downstream from the point of initial contact between the gases, such as the base of the radial gas orifices adjacent the cup floor containing the axial gas orifice, which produces new and unexpected advantages for the production of valuable syngas. However, for the large scale reactors of commercial interest, use of a single nozzle injector would require a large $D_{AX}$ at any reasonable injector velocity, and so achieving high $E_m$ in a short $L/D_{AX}$ is not sufficient. Thus, a critical feature of this invention is the use of an injector having a plurality of mixing nozzles or chambers or cups, which serves to reduce the injector dimensions (reducing $D_{AX}$) and reduce the physical distance (and hence time) required to achieve a high degree of feed uniformity.

Finally, the use of a plurality of injector nozzles presents the problem that multiple nozzles can interact and become unstable, and also presents the problem that multiple injector nozzles must all be fed at the same stoichiometry. Thus, a critical feature of this invention is the use of an elevated pressure drop or $\Delta P/P_c$ for the feed streams in the nozzles to provide uniform, stable, and non-interacting flows of the gaseous premix into the partial oxidation zone.

DETAILED DESCRIPTION OF THE DRAWINGS

Figure 1:
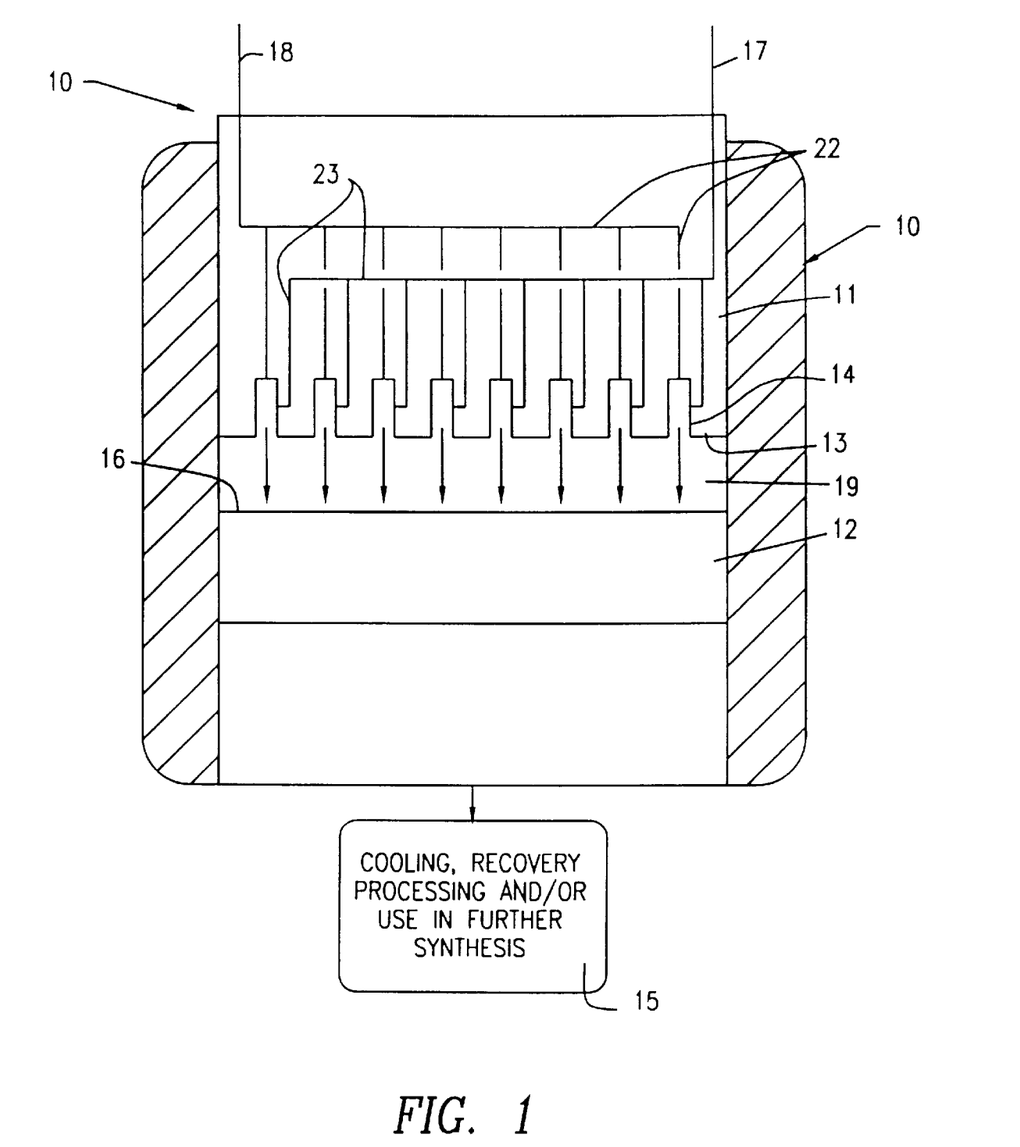
FIG. 1 is a diagrammatic illustration of a compact injector/autothermal reforming apparatus according to one embodiment of the present invention.

Referring to FIG. 1, the gas-injector/autothermal reforming reactor apparatus 10 thereof comprises an assembly of an upper multi-jet, face mix gas injector means 11 and a reaction chamber having an upper gas phase partial oxidation section 19, and a lower catalytic zone 12 and a downstream syngas cooling recovery and/or processing unit 15. The plurality of jet nozzles or cups 14 at the exit face surface 13 of the injector means 11 discharge directly into the partial oxidation section 19 to assure the uniform passage of a homogenous gaseous premix of the hydrocarbon and oxygen gases, in the desired predetermined oxygen ($O_2$)/carbon ($C_1$) ratio of about 0.3–0.8 preferably 0.45–0.7, into the partial oxidation section 19 and then into the catalytic zone 12.

Separate methane supply conduit 17 and oxygen supply conduit 18 feed continuous streams of preheated, pressurized methane and oxygen into and through the manifold methane passages 23 and oxygen passages 22, respectively, for intermixing within the plurality of jet nozzles or cups 14 at the face surface 13 of the injector means 11, or for angular impingement immediately beyond the face surface 13 of the injector means 11. The methane passages 23 and oxygen passages 22 have exit orifices sized so that the pressure drop of each gas as it passes through these passages and orifices is maintained at a value that is more than 1% lower, preferably more than 3% lower, and possibly more than 5% lower than the lower of the upstream pressures ($P_u$) in the methane conduit 17 or the oxygen conduit 18 relative to the inlet pressure ($P_c$) to the POX section 19. This ensures even distribution of the hydrocarbon and oxygen gases to the plurality of jet nozzles or cups 14, ensuring that each jet nozzle or cup has the same oxygen/carbon ratio, which uniformity eliminates local hot spots, local soot formation, and reactor instabilities.

Thereafter the effluent from the partial oxidation section 19 flows into and through the fixed catalyst bed 16 within the catalytic steam reforming section 12. Bed 16 preferably comprises a thermally-stable inorganic refractory oxide support which is impregnated with steam reforming catalyst such as one or more metals from Group VIII of the Periodic Table, preferably one or more noble metals or nickel. The steam reforming reaction is endothermic and draws heat from the POX effluent to cool the gases while it reacts steam and residual methane to form gases which are useful for the synthesis of other chemical compounds.

The reaction of the gaseous premix within the partial oxidation zone 12 requires means to cause the initiation of the reactions. Suitable means to initiate reaction in a gaseous partial oxidation zone include heating of the zone, as well as the introduction of a spark, plasma, or hot glow plug into the zone.

It is preferred that the jet nozzles or cups 14 are sized so that the gas residence time of the mixture in the injector means 11 is substantially less than the autoignition delay time of the mixture, and preferably less than 9 milliseconds, more preferably less than 2 milliseconds, and most preferably less than about 0.5 millisecond. This prevents reaction of the gaseous premix in the gas phase within the injector means 11, and/or before becoming highly mixed, which reaction would proceed with excessive heat generation that is damaging to the catalyst and the syngas reactor.

The injection of the present pre-heated and pressurized light hydrocarbon and oxygen gases into admixture in the desired proportions to form a pressure-reduced gaseous premixture, and then into the reaction zone 19 within a time period of less than 9, 2, or 0.5 millisecond is a preferred embodiment of the present autothermal reforming (ATR) process. In the present process it is essential for reduction of reactor size, soot formation, and hot spots to pre-form a gaseous premix of the desired stoichiometric ratio of the gases before injecting that homogenous gaseous premix into the partial oxidation reaction zone 19 since the pre-formed mixture has the desired stoichiometry for the most desirable syngas formation. It is highly advantageous for safety reasons when mixing pre-heated and pressurized gases, to create the premixture at a minimum of time before injection of the homogenous gaseous premix into the partial oxidation reaction zone 19.

Figure 2:
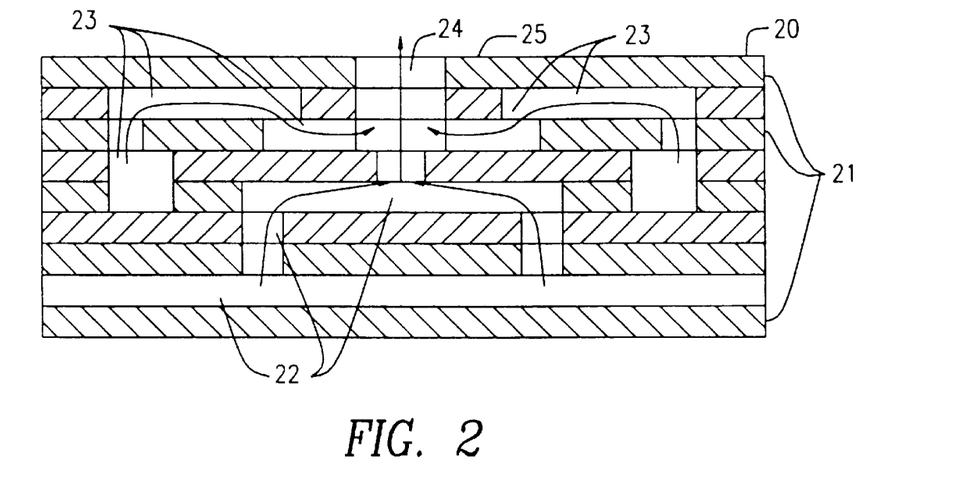
FIG. 2 is a cross-sectional side view of a single nozzle section of a multi-jet face-mix injector useful in association with a syngas reactor according to the present invention.
Figure 3:
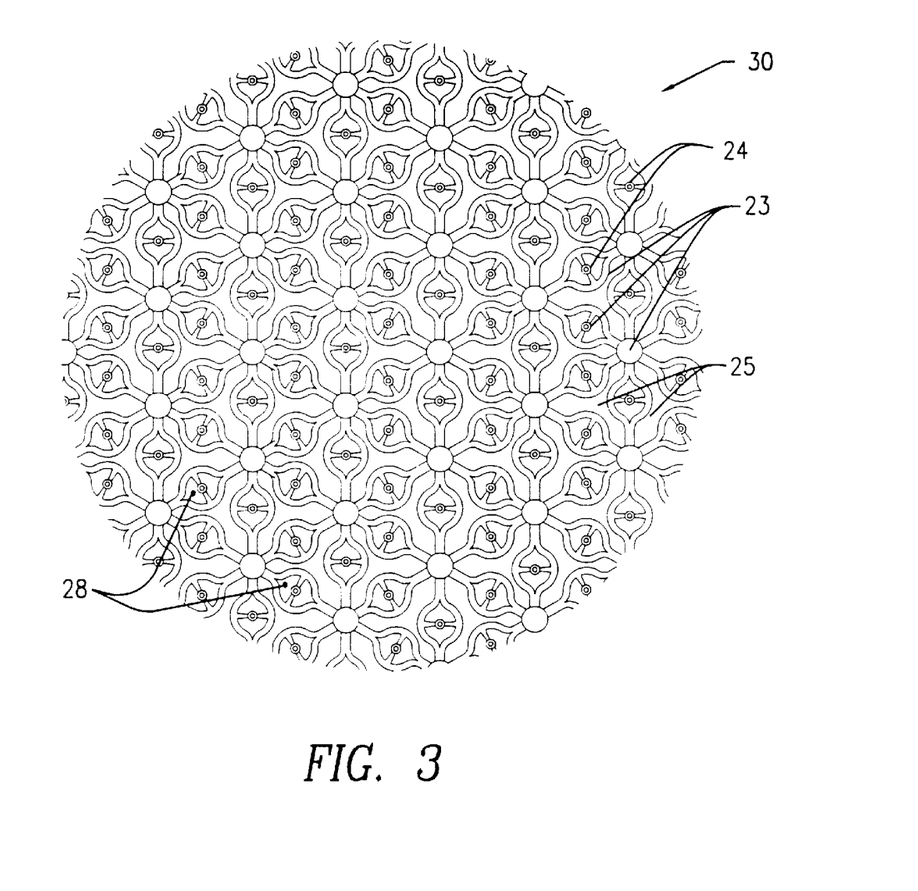
FIG. 3 is a plan view of the face surface and certain channels beneath the face surface of a multi-nozzle injector as illustrated in FIG. 1.

Suitable feed injectors that meet the aforementioned requirements have been developed, for use in the aerospace industry. One such device is known as a microinjector or platelet burner. The principal of this injector is that many small mixing nozzles ("microjets") are uniformly-spaced over one large diameter face. Any mixing approach can be used in the nozzles, but some will be more amendable to fabrication and to rapid mixing. A preferred approach is the use of nozzles called "triplets", in which there is a central or axial flow of one reactant, such as an oxygen gas, through the oxygen passages of a manifold, and the second reactant, such as a hydrocarbon gas, is introduced in two opposed, or somewhat radial jets up to about 1 inch below the burner face through isolated methane passages of the manifold. An advantage of this triplet design as applied to the present process is that is has very good anti-flashback properties, which are highly desired for hot, high pressure $CH_4/O_2$ mixing. FIGS. 2 and 3 illustrate such an injector, manifold, isolated gas passages, injector face, and suitable triplet mixing nozzles or cups.

Injector face sections 30 of the type shown in FIG. 3 can be built in large diameters, with spacing of the mixing elements or cups 24 smaller than 1 inch. Thus, to achieve homogeneous reaction premixes, mixing lengths and residence times are kept very low. In a preferred embodiment, a minority of the feed injection nozzles 24 may be designed to be a different nozzle 28 that creates a gaseous premix having a slightly higher than average oxygen/methane ratio. One such pattern, wherein one out of six injection nozzles is a high-$O_2$ nozzle 28 ("marked with a "*") is shown in FIG. 3. The presence of such nozzles 28, ejecting gaseous premix with an oxygen/carbon ratio of 0.75 to 1.5 can serve to prevent the reaction of the bulk mixture from being extinguished, particularly at the high gas velocity associated with higher reactor productivity.

A preferred high velocity interior-mixing or recessed cup injector 20, developed for use in the aerospace industry, is illustrated by FIG. 2 of the present drawings and is illustrated by FIGS. 3–6 of U.S. Pat. No. 3,881,701, the disclosure of which is hereby incorporated herein by reference thereto. However, the exterior-mixing injectors illustrated by FIGS. 1, 2 and 2a of U.S. Pat. No. 3,881,701 are also suitable for use according to the present invention, whereby the reactant gases impinge and mix immediately above or beyond the injector surface. The platelet-type injectors of this Patent are produced by forming fine fluid-flow methane and oxygen passages on the surfaces of or within a plurality of thin metal plates 21 containing interconnecting bores in predetermined areas, and diffusion bonding the metal plates together to form injectors comprising manifolds containing fine isolated gas passages for oxygen and methane, which passages communicate at a plurality of microjet nozzles or cups 24 at a face surface 25 of the injector, or impinge immediately beyond the injector surface 25, to mix the gases and eject the gaseous premix at high velocity. The present injector means 11 are gas delivery manifolds which are engineered to provide equal specified flow of both gases to all microjet nozzles or cups 24.

Referring to FIG. 2, of the Drawings, the injector means 20 thereof comprises a plurality of thin metal plates 21 which are provided in predetermined areas thereof with segregated oxygen passages 22 and methane passages 23, respectively, which communicate with sources of oxygen and methane, respectively, under high temperatures and pressures ($P_u$) The passages 22 and 23 divide the total flow of the individual gases into a very large number of precisely-metered, very small streams of the individual gases, which streams communicate within each of a plurality of mixing nozzles or cups 24 which are open to the face surface 25 of the injector 20 means. Cups 24 are tubular, such as oval or cylindrical.

The injector means 20 isolates the heated, pressurized streams of the methane and oxygen until they mix within the plurality of cups 24 and are injected as a gaseous premix at high velocity of 25 to 1000 ft/sec, more preferably 50 to 500 ft/sec., most preferably 50 to 300 ft/sec., at a reduced pressure or a pressure drop of more than 1%, preferably more than 3% however, and possibly more than 5% lower than the lowest upstream pressure ($P_u$) relative to the inlet pressure ($P_c$) the partial oxidation reaction section 19. The gaseous premix is passed directly into the POX reaction section 19 where the partial oxidation combustion reaction occurs, and the effluent passes into the catalytic steam reforming section 12, where the steam reforming reaction is completed in contact with the fixed catalyst bed 16. The formed syngas is collected in the recovery/processing unit 15.

A further advantage of the gas mixers/injectors of FIG. 2 is that one or both gases can be used to cool the face surface 25 of the injector means 20 by heat exchange therewith to mitigate chemical damage and prevent heat damage thereto due to the proximity to the high temperature partial oxidation section 19, which has a temperature between abut 1200°–1900° C., preferably between about 1000°–1650° C. This cooling is accomplished by the circulation of the gas or gases, preheated to feed temperatures of 100°–700° C., preferably between 300° and 600° C., through circulation passages, such as 23, immediately below and parallel to the uppermost plate 21 forming the face surface 25 of the injector means 20 to cool the face surface 25 well below the reaction temperature, such as 1400° C., within the POX reaction section 19, as the gas or gases pass through the manifold to the mixing cups 24.

FIG. 2 illustrates a cup 24 which may have a diameter of about 0.10" and a depth of about 0.10" which may be doubled to an extended depth of about 0.20", for example. The methane gas inlets 23 are split inlets each having an exit orifice width W of about 0.05" which inject hot pressurized methane gas flows horizontally from opposed sides of the cup 24 radially against the vertical flow of hot pressurized oxygen gas introduced through the central inlet 22 and exit orifice having a diameter of about 0.060", for example, to form the homogeneous reactant gaseous premix which is ejected from the cup 24 in less than 9 milliseconds, preferably less than 2 ms, most preferably less than 0.5 ms.

Figure 4:
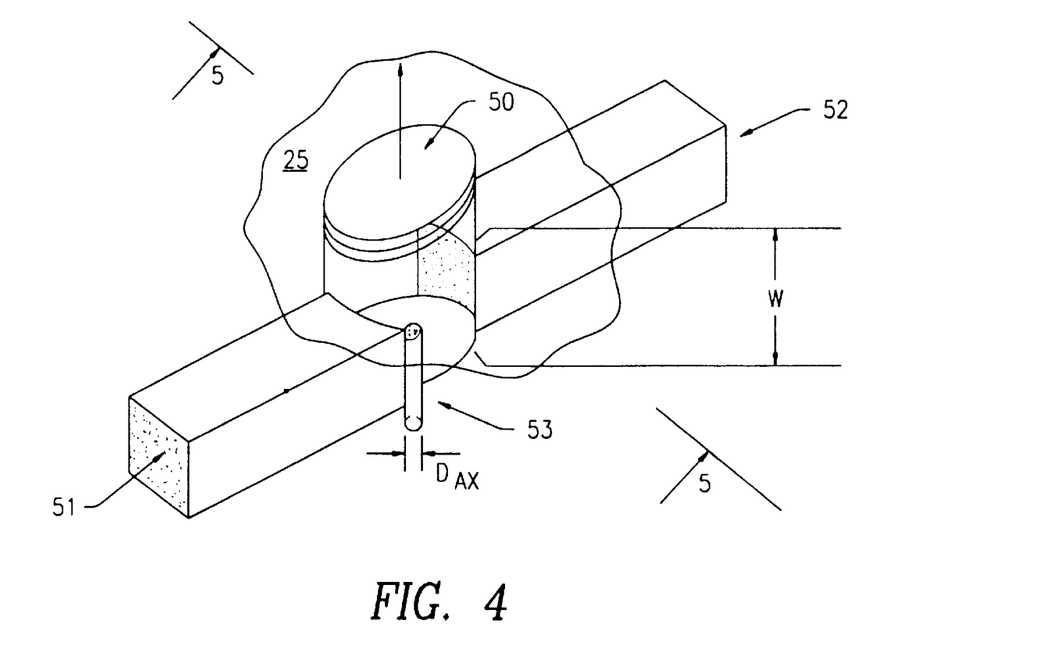
FIG. 4 is a perspective view of an individual injector of FIG. 2, according to one embodiment of the present invention.
Figure 5:
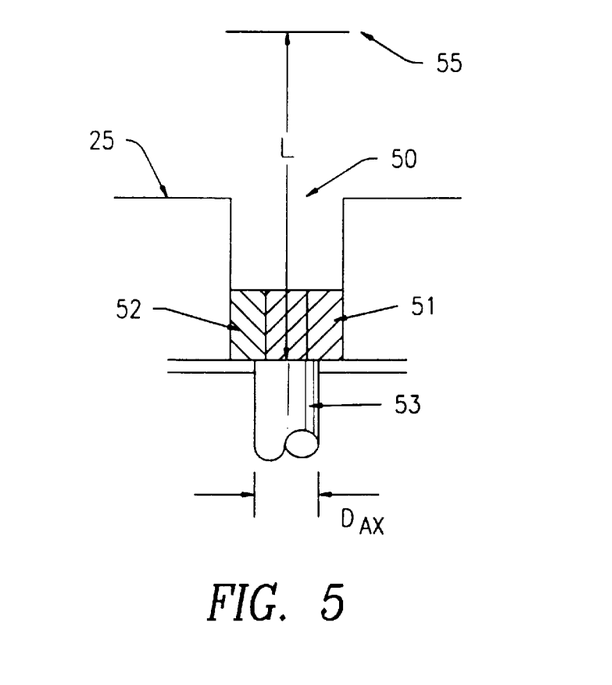
FIG. 5 is a cross-sectional view taken along the line 5—5 of FIG. 4.

FIGS. 4 and 5 illustrate an individual triplet mixing nozzle or cup 50 as an alternative design for each cup 14 of FIG. 1 or for each cup 24 of FIGS. 2 or 3. Referring to the triplets of FIGS. 4 and 5, the somewhat radial horizontal methane supply conduits 51 and 52, each having a width W of about 0.30", are slightly offset relative to each other so that the methane gas flows therefrom horizontally and tangentially against the vertical or axial oxygen gas flow from central vertical oxygen conduit 53 each have an exit orifice diameter $D_{AX}$ of about 0.30", to cause the gas mixture to swirl within the mixing cup 50 as it is formed and ejected in less than 9 ms. The mixing cups 50 of FIGS. 4 and 5 have a design preferred for use in gas phase partial oxidation zones 19 since the cup depth is only about 0.5 inch for a cup diameter of about 0.5 inch. The larger injector of FIGS. 4 and 5 is more resistant to fouling, and thus may be preferred provided that residence time limits within the injector are not exceeded. The gaseous premix ejected from the mixing cup 50 can be characterized for mixedness $E_m$ at a plane 55 located a distance L downstream of the injector means, extending from the point of initial contact between the gases, e.g., the lower level of the radial gas orifices, adjacent the floor of the mixing cup, as shown in FIG. 5. Preferred injectors achieve $E_m > 75\%$, more preferably $>80\%$ at downstream distances $L < 6 D_{AX}$.

It will be apparent to those skilled in the art that the specific number, spacing and dimensions of the present nozzles can be varied depending upon the particular process being conducted and the dimensions of the reactor and the partial oxidation section 19 being used in association with the injector means 11, and the size of the latter.

For example the cup 24 of FIG. 2, preferably cylindrical, can have a maximum diameter up to about one inch, preferably up to about one-half inch, and a maximum depth, down to the methane inlets which is also up to about one inch. At these maximum dimensions, the diameter or width of the exit orifices of the oxygen inlet conduits 22 and of the methane inlet conduits 23 will be larger in order to provide sufficient gas volumes and pressures to maintain a methane-to-oxygen ratio which is greater than 1, at least at the majority of the nozzles 24, to avoid over oxidation, especially $CO_2$ formation, in all areas of the reactor before combustion begins.

Also, it is essential to maintain the gas pressure drop ($\Delta P$) through the injector at a value which is more than 1% lower, preferably more than about 3% lower, and possibly more than 5% lower than the lowest upstream pressure ($P_u$) of either of the gases, relative to the inlet pressure ($P_c$) existing within the POX section 19, i.e., ($P_u - P_c$)/$P_c$ is greater than 1%, preferably greater than about 3%, and possibly greater than 5%, where $P_u$ is the lowest upstream gas pressure, $\Delta P = (P_u - P_c)$ is the pressure drop within the injector and Pc is the inlet pressure of the partial oxidation section 19. The upper limit of this value can become impractically high as the flow velocity through the injector means 11 approaches sonic. Generally the flow velocity is maintained within practical limits for economic reasons and to avoid flame blow-out or catalyst bed attrition. Also lower flow velocity permits cooling of the POX gases by the endothermic steam reforming reaction, to protect the catalyst bed 12.

According to a further embodiment of the present invention, the formed useful syngas is cooled, recovered and treated for use in further synthesis processing. Such treatment may include purification to remove the low amounts of ammonia and hydrogen cyanide produced in the partial oxidation process. Suitable processes for removing ammonia and hydrogen cyanide from gaseous streams are well known in the art. The removal of ammonia and hydrogen cyanide may be effected in a single stage or in a plurality of stages. The cooling step may be effected before or after the purification treatment steps, as appropriate to accommodate preferred temperatures of the treatment process. Small amounts of hydrogen may be separated out of the syngas for use in a hydrocarbon upgrading stage.

The treated syngas may be used in processes that produce methanol and methanol based products, hydrocarbon synthesis (HCS) products such as liquid hydrocarbons, olefins, alcohols and aldehydes, oxo-synthesis products, ammonia and ammonia based fertilizers and chemicals, town gas or reduction gas used for the production of sponge iron, etc.

In a conventional hydrocarbon synthesis (HCS) process, liquid and gaseous hydrocarbon products are formed by contacting the present syngas comprising a mixture of $H_2$ and CO with a suitable Fischer-Tropsch type HCS catalyst, under shifting or non-shifting conditions. Suitable Fischer-Tropsch catalysts comprise one or more Group VIII catalytic metals such as Fe, Ni, Co, Ru, and Re. In one embodiment, the catalyst comprises catalytically effective amounts of Co and one or more of Re, Ru, Fe, Ni, Th, Zr, Hf, U, Mg, La on a suitable inorganic support material, preferably one which comprises one or more refractory metal oxides. Preferred supports for cobalt-containing catalysts comprise titania, particularly when employing a slurry HCS process in which higher molecular weight, e.g., $C_{10+}$ products, primarily paraffinic liquid hydrocarbon products are desired.

The hydrocarbon products produced by an HCS process according to an embodiment of the present invention are typically upgraded to form suitable products such as, synthetic crude oil, liquid fuels (e.g., jet and diesel), or lubricating, industrial or medicinal oil, waxy hydrocarbons, olefins (by, e.g., catalytic cracking or steam cracking). These processes are well known to those skilled in the art and need not be described here. All or a portion of the HCS products can be fractionated and then converted in one or more steps with or without a suitable catalyst or in the presence of hydrogen or both. Hydroconversion is usually preferred and includes mild hydrotreating (minimal branching) to make pumpable liquids, hydroisomerization (somewhat more branching, e.g., 25–65%, and preferably mono-methyl branching) for making distillates such as jet fuels and diesel fuels, and more severe hydroisomerization (wherein virtually all, e.g., less than 10 wt % and preferably less than 5 wt % of the feed remains unconverted) to make lube oils. These processes are also well known and reported in the literature in so far as catalysts and reaction conditions are concerned.

The foregoing description is only illustrative of the invention. Accordingly, the present invention is intended to embrace all alternatives, modifications and variances which fall within the scope of the appended claims.

What is claimed is:

1. An autothermal process for the partial oxidation and steam reforming of hydrocarbons to form synthesis gas containing hydrogen and carbon monoxide, comprising providing individual streams of hydrocarbon gas and oxygen or an oxygen-containing gas, each stream being at independent elevated temperatures and pressure of 10–100 atmospheres, injecting said individual streams into admixture with each other through an injector means having a plurality of mixing nozzles and having separate passages for the hydrocarbon gas and the oxygen or oxygen containing gas, the pressure drop in the passages being at least 1% of the lowest upstream pressure of either of said gases, passing the resulting gaseous premix from the plurality of mixing nozzles into a partial oxidation reaction zone in less than 9 milliseconds after the pre-mix is formed to form a partially oxidized gaseous reaction mixture, passing the partially oxidized reaction mixture into a catalytic steam reforming zone to produce said synthesis gas, and recovering said synthesis gas.

2. The process of claim 1 in which the resulting gaseous premix has a pressure drop of at least 3%.

3. The process of claim 1 in which the resulting gaseous premix has a pressure drop of at least 5%.

4. The process according to claim 1 in which the steam reforming zone comprises a fixed arrangement of steam reforming catalyst containing one or more metals from Group VIII of the Periodic Table.

5. The process according to claim 4 in which said steam reforming catalyst is supported on a honeycomb ceramic or metallic monolith or porous foam carrier.

6. The process of claim 4 in which said metals are selected from the group consisting of platinum, rhodium, and nickel.

7. The process of claim 4 in which the catalyst comprises inorganic refractory oxide carrier particles supporting the catalyst.

8. The process of claim 1 in which each mixing nozzle comprises a mixing cup recessed below the face surface of the injector device into which cups the gas streams are separately introduced through individual gas orifices and impinged to form said premix.

9. The process of claim 8 in which one of the gases is injected from an axial orifice having a diameter ($D_{AX}$) as an axial stream and the other gas is injected from one or more radial or somewhat radial gas orifices as one or more radial streams which impinge upon the axial stream to form the gaseous premix.

10. The process of claim 9 in which the oxygen or oxygen-containing gas is injected as the axial stream and the hydrocarbon gas is injected as the radial stream(s).

11. The process of claim 9 wherein the ratio of the summed momenta of the radially injected streams to the momentum of the axial stream is within the range of 0.5–4.0.

12. The process of claim 9 wherein the efficiency of the mixing ($E_m$) of the individual gases is at least 75% when the gaseous premix is at a distance (L) which is up to ten times the diameter ($D_{AX}$) of the gas orifice of the axial stream.

13. The process according to claim 9 which comprises introducing said somewhat radial gas streams as opposed but offset streams which impinge the axial stream tangentially to product a swirling gas mixture within the mixing cups.

14. The process of claim 1 wherein each of the mixing nozzles comprises a tubular cup recessed in the face surface of the injector means, comprising injecting one of the gases into the cup as an axial stream through an axial orifice having a diameter ($D_{AX}$) in the bottom of the cup, and injecting the other gas into the cup as at least two opposed radial streams through opposed radial orifices in the side wall of the cup to form a gaseous premix having an $E_m > 75\%$ at a downstream distance (L) which is up to about six times the diameter ($D_{AX}$) of the axial gas orifice.

15. The process of claim 1 which comprises passing the gaseous premix into the partial oxidation reaction zone at a velocity between about 25 to 1000 feet/sec.

16. The process according to claim 1 in which the molar proportions of oxygen ($O_2$) per number of carbon atoms in the hydrocarbon are between 0.3 and 0.8 to 1.

17. The process according to claim 16 wherein up to about 25% of the mixing nozzles are designed to inject a gaseous premix having molar proportions of oxygen per carbon atom of the hydrocarbon gas between 0.75 and 1.5 to 1.0 to provide a minority of spaced nozzles emitting a more oxygen-rich gaseous premix.

18. The process according to claim 1 which comprises passing the gaseous premix in less than 2 milliseconds after the mixture is formed.

19. The process according to claim 18 which comprises passing the gaseous premix in less than 0.5 milliseconds after the mixture is formed.

20. The process according to claim 1 which comprises using an injector means comprising a gas manifold assembled from a plurality of thin metal plates forming therebetween or therein and/or therethrough a plurality of segregated gas passages for supplying the individual gases through said orifices into said mixing nozzles at the face surface of the injector means.

21. The process according to claim 20 which comprises assembling said plates by diffusion-bonding them together.

22. The process according to claim 20 which comprises providing a plurality of said gas passages beneath and parallel to the metal plate forming the face surface of the injector means, and circulating at least one of the gases through said gas passages to cool the face surface of the injector by heat exchange.

23. Process according to claim 1 which comprises the step of further processing the recovered syngas via the Fischer-Tropsch reaction to produce liquid hydrocarbons.

24. Process according to claim 23 which comprises the further step of reacting said liquid hydrocarbons by hydro-conversion to produce useful products.

25. An autothermal apparatus for the partial oxidation and steam reforming of hydrocarbon gas to convert such gas to useful synthesis gas containing hydrogen and carbon monoxide, comprising injector means having a manifold containing a plurality of segregated passages for injecting heated and pressurized individual streams of the hydrocarbon gas and oxygen or an oxygen-containing gas into admixture with each other in the desired molar proportions through individual orifices into a plurality of mixing nozzles which are spaced over the face of the injector while producing a drop in the pressure of said gases, through said injector, to produce a gaseous premix having a pressure which is at least 1% lower than the lowest upstream pressure of either of said gases, and for passing the formed gaseous premix into a partial oxidation reaction zone in less than 9 milliseconds after the formation of the pre-mix to form a partially oxidized gaseous reaction mixture in said zone, and a reaction chamber comprising said partial oxidation reaction zone for reacting the gaseous premix to produce the partially oxidized gaseous reaction mixture, a downstream steam reforming reaction zone containing a steam reforming catalyst in fixed arrangement for receiving the partially oxidized gaseous reaction mixture and reacting any hydrocarbon gas and steam present therein to form said useful synthesis gas, and means for recovering the formed synthesis gas from said reactor.

26. An apparatus according to claim 25 in which the steam reforming reaction zone comprises inorganic refractory oxide carrier particles supporting the steam reforming catalyst.

27. An apparatus according to claim 25 in which the steam reforming catalyst comprises one or more metals from Group VIII of the Periodic Table.

28. An apparatus according to claim 27 in which said metal is selected from the group consisting of platinum, rhodium, and nickel.

29. An apparatus according to claim 25 in which the injector means is designed to produce a gaseous premix having a pressure drop of at least 3% of the lowest upstream pressure of either of the gases, relative to the pressure in the inlet of the reaction chamber.

30. An apparatus according to claim 25 in which the injector means is designed to produce a gaseous premix having a pressure drop of at least 5% of to the lowest upstream pressure of either of the gases, relative to the pressure in the inlet of the reaction chamber.

31. An apparatus according to claim 25 in which the injector means is designed to pass the gaseous premix into the partial oxidation reaction zone within about 2 milliseconds after the mixture is formed.

32. An apparatus according to claim 25 in which the injector means is designed to pass the gaseous premix into the partial oxidation reaction zone within about 0.5milliseconds after the mixture is formed.

33. An apparatus according to claim 25 in which each of said mixing nozzles comprises a tubular mixing cup having a bottom orifice having a diameter ($D_{AX}$) for admitting an axial flow of oxygen or an oxygen-containing gas and having opposed side orifices for admitting somewhat radial flows of the hydrocarbon gas to form the gaseous premix within the cup, open to the partial oxidation zone.

34. An apparatus according to claim 25 in which the said injector means comprises a manifold assembled from a plurality of thin plates forming therebetween or therein and/or therethrough a plurality of segregated passages for supplying the individual gases through individual gas orifices into the mixing nozzles present at the face surface of the injector.

35. The apparatus according to claim 34 in which said plates are diffusion-bonded together.

36. An apparatus according to claim 34 in which said manifold comprises a plurality of gas passages beneath and parallel to the plate forming the face surface thereof to cool said face surface by heat-exchange.

37. An apparatus according to claim 33 wherein the injector means is designed to provide an efficiency of mixing ($E_m$) of the individual gases of at least 75% when the gaseous premix is at a distance (L) which is up to ten times the diameter ($D_{AX}$) of the gas orifice of the axial stream.

38. The apparatus according to claim 33 in which said opposed side orifices are radially-offset relative to each other so that the somewhat radial flows of the hydrocarbon gas impinge the axial flow tangentially to cause the formed gas mixture to swirl within each cup.

39. An apparatus according to claim 25 in which said injector means is adapted to pass said gaseous premix into the partial oxidation reaction zone at a velocity between about 25 and 1000 ft/sec.

40. An apparatus according to claim 25 in which the molar proportions of oxygen ($O_2$) per number or carbon atoms in the hydrocarbon gas are between 0.3 and 0.8.

* * * * *